US011526559B2

(12) United States Patent
Srinivasan et al.

(10) Patent No.: US 11,526,559 B2
(45) Date of Patent: Dec. 13, 2022

(54) CONTENT FILTERING BASED ON USER STATE

(71) Applicant: INTERNATIONAL BUSINESS MACHINES CORPORATION, Armonk, NY (US)

(72) Inventors: Sathyanarayanan Srinivasan, Austin, TX (US); Eliza Reed Farley, Brooklyn, NY (US); Alexander Kenneth Rice, Cambridge, MA (US); Maureen Kraft, Hudson, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 16/671,260

(22) Filed: Nov. 1, 2019

(65) Prior Publication Data
US 2021/0133242 A1 May 6, 2021

(51) Int. Cl.
*G06F 16/906* (2019.01)
*H04N 21/454* (2011.01)
*H04N 21/45* (2011.01)
*G06F 16/9035* (2019.01)

(52) U.S. Cl.
CPC ........ *G06F 16/906* (2019.01); *G06F 16/9035* (2019.01); *H04N 21/454* (2013.01); *H04N 21/4532* (2013.01)

(58) Field of Classification Search
CPC . G06F 16/906; G06F 16/9035; H04N 21/454; H04N 21/4532
USPC ...................................................... 707/732
See application file for complete search history.

(56) References Cited

U.S. PATENT DOCUMENTS

| | | | |
|---|---|---|---|
| 7,974,994 B2 | 7/2011 | Li | |
| 8,079,044 B1* | 12/2011 | Craner | H04N 21/4542 725/28 |
| 9,037,578 B2 | 5/2015 | Brust | |
| 2004/0123135 A1* | 6/2004 | Goddard | H04N 21/2353 726/27 |
| 2013/0283162 A1 | 10/2013 | Aronsson | |
| 2014/0351846 A1* | 11/2014 | Dang | H04N 21/44231 725/28 |
| 2015/0099946 A1 | 4/2015 | Sahin | |
| 2015/0249864 A1* | 9/2015 | Tang | G06Q 30/00 725/28 |

(Continued)

FOREIGN PATENT DOCUMENTS

WO    WO 2015/135066 A1 * 9/2015 ............. G06Q 30/02

OTHER PUBLICATIONS

Yuan, Eric, et al., "Attribute Based Access Control (ABAC) for Web Services", ICWS 2005, Orlando, FL, Jul. 11-15, 2005, pp. 569-577.*

(Continued)

*Primary Examiner* — Robert Stevens
(74) *Attorney, Agent, or Firm* — Kristofer L. Haggerty

(57) ABSTRACT

A method, a computer program product, and a computer system for filtering content based on user state is disclosed. Exemplary embodiments include associating a user with one or more cohorts and extracting one or more features from a content retrieved by the user. Moreover, exemplary embodiments may further include determining whether at least one of the one or more features conflict with at least one of the one or more cohorts.

20 Claims, 5 Drawing Sheets

(56) References Cited

U.S. PATENT DOCUMENTS

| | | | |
|---|---|---|---|
| 2015/0301703 A1 | 10/2015 | Steinberg | |
| 2015/0317801 A1* | 11/2015 | Bentley | G08B 21/043 |
| | | | 382/107 |
| 2016/0055420 A1 | 2/2016 | Karanam | |
| 2016/0292881 A1* | 10/2016 | Bose | G08B 21/0492 |
| 2017/0365101 A1* | 12/2017 | Samec | A61B 5/6803 |

OTHER PUBLICATIONS

Oh, Sejong, et al., "Task—role-based access control model", Information Systems, vol. 28, Issue 6, Elsevier Science Ltd., Sep. 2003, pp. 533-562.*

Abualsaud, Khalid, et al., "A Survey on Mobile Crowd-Sensing and Its Applications in the IoT Era", IEEE Access, vol. 7, Jan. 11, 2019, pp. 3855-3881.*

Bergman, "Night Noise Boosts Blood Pressure", https://www.webmd.com/hypertension-high-blood-pressure/news/20080 . . . printed Aug. 20, 2019, pp. 1-4.

Buckley et al., "Triggering of Acute Coronary Occulusion by Episodes of Anger", European Heart Journal: Acute Cardiovascular Care, https://journals.sagepub.com/doi/abs/10.1177/2048872615568969?rfr_da . . . , Feb. 23, 2015, pp. 1-3.

Cleveland Heart Lab, Inc., "7 Surprising Heart Attack Triggers", http://www.clevelandheartlab.com/blog/7-surprising-heart-allack-triggers/, Mar. 6, 2019, pp. 1-2.

Http://get.netnanny.com/net-filter/?pid=3&utm_source=bing&utm_med . . . , "Net Nanny", Net Nanny Parental Control Software, printed Aug. 20, 2019, pp. 1-3.

Hunter, "How Does Sound Affect Heart Rate?", https://sciencing.com/sound-affect-heart-rate-5633108.html, Apr. 24, 2017, pp. 1-5.

Mell et al., "The NIST Definition of Cloud Computing", National Institute of Standards and Technology, Special Publication 800-145, Sep. 2011, pp. 1-7.

Panopticlick, "Is Your Browser Safe Against Tracking?", https://panopticlick.eff.org/, printed Aug. 20, 2019, pp. 1-2.

W3C, "Three Flashes or Below Threshold", Understanding Success Criterion 2.3.1| Understanding WCAG 2.0, printed Mar. 20, 2019, pp. 1-4.

Wang, "Noise-Control: 11 Tips for Helping Your Child with Autism Deal with Noise", https://www.friendshipcircle.org/blog/2014/05/06/noise-control-11-tips-f . . . , printed Aug. 20, 2019, pp. 1-7.

Youtube, "Search: list", https://developers.google.com/youtube/v3/docs/search/list, printed Aug. 20, 2019, pp. 1-21.

* cited by examiner

CONTENT FILTERING BASED ON USER STATE

BACKGROUND

The exemplary embodiments relate generally to filtering multimedia content, and more particularly to filtering multimedia content based on user state.

Individuals are inundated with content, whether the content be in the form of text, images, audio, video, etc. While content may be beneficial for purposes such as education, entertainment, humor, etc., content may also be detrimental to an individual based on a user state, such as a health condition. For example, users with epilepsy may be susceptible to seizures due to flashing lights within content while users with motion sickness may be susceptible to the movement of virtual reality experiences.

SUMMARY

The exemplary embodiments disclose a method, a computer program product, and a computer system for content filtering based on user state. Exemplary embodiments include associating a user with one or more cohorts and extracting one or more features from a content retrieved by the user. Moreover, exemplary embodiments may further include determining whether at least one of the one or more features conflict with at least one of the one or more cohorts.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
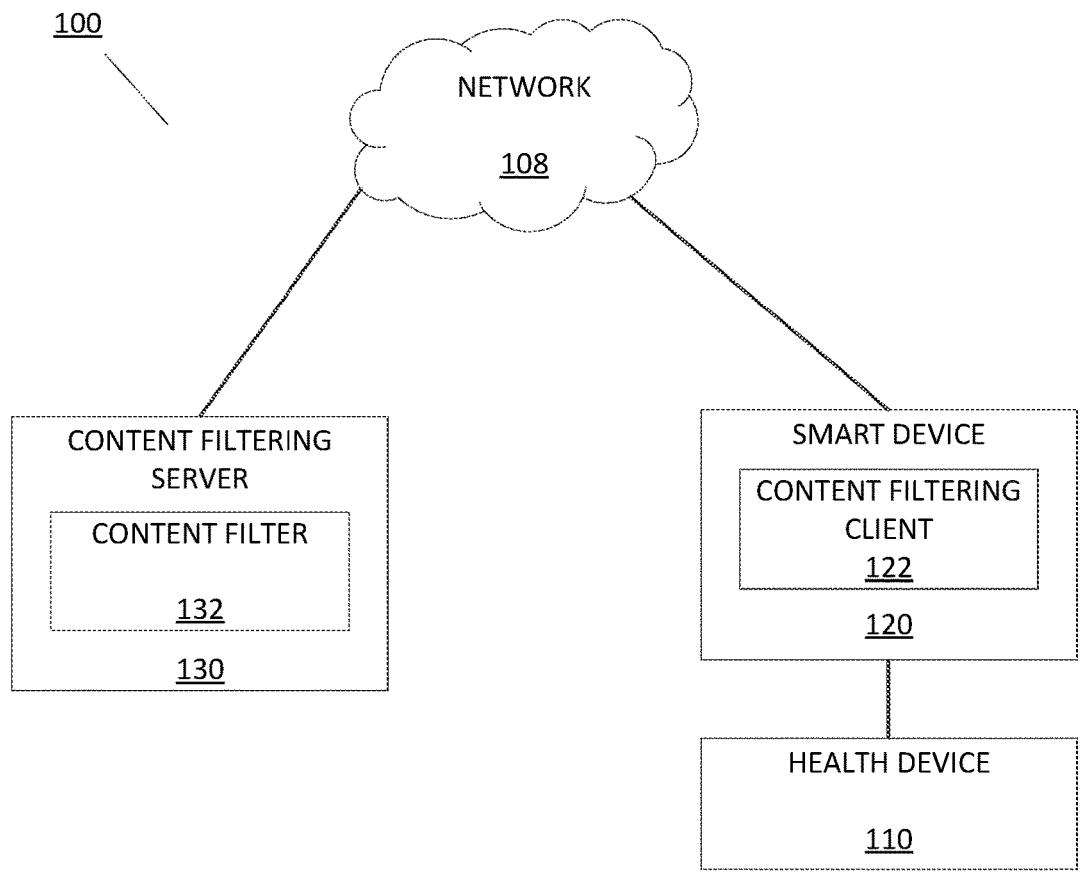
FIG. 1 depicts an exemplary schematic diagram of a content filtering system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Individuals are inundated with content, whether the content be in the form of text, images, audio, video, etc. While content may be beneficial for purposes such as education, entertainment, humor, etc., content may also be detrimental to an individual based on a user state, such as a health condition. For example, users with epilepsy may be susceptible to seizures due to flashing lights within content while users with motion sickness may be susceptible to the movement of virtual reality experiences.

Exemplary embodiments disclose a means for filtering content based on a user state, such as user health, mental, or other condition. Highlights of the exemplary embodiments include adaptive and custom filtering of content for a user based on the user state, resulting in a safer and more enjoyable experience for the user. Use cases include notifying a user of a potential conflict between content and user state, for example notifying a user with epilepsy prior to viewing content that includes flashing lights, notifying a user with motion sickness prior to a virtual reality experience, notifying a user with a heart condition prior to listening to audio with sudden loud noises, etc. Overall, embodiments exemplified herein relate to identifying content as conflicting for a user based on user state, thereby increasing the safety of and improving a user experience of content, as will be described in greater detail herein.

FIG. 1 depicts the content filtering system 100, in accordance with exemplary embodiments. According to the exemplary embodiments, the content filtering system 100 may include a health device 110, a smart device 120, and a content filtering server 130, which may be interconnected via a network 108. While programming and data of the exemplary embodiments may be stored and accessed remotely across several servers via the network 108, programming and data of the exemplary embodiments may alternatively or additionally be stored locally or remotely on as few as one physical computing device or amongst other computing devices than those depicted. For example, in embodiments, the content filter 132 and necessary components may be entirely stored on the smart device 120 for use locally without the need to connect to the network 108.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies that include 2.4 gHz and 5 gHz Internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the health device 110 may be any device capable of collecting, storing, processing, and receiving/transmitting data, such as data related to a user state. In embodiments, for example, the health device 110 may be a smart wearable device, such as glasses, a contact lens, watch/wristband, ring, anklet, headband, mouthpiece, and the like. In further embodiments, the health device 110 may be a special purpose-device, such as an insulin pen, pacemaker, catheter, meter, implantable device, etc. Moreover, in embodiments, the health device 110 may include computing components used for collecting, processing, aggregating, and receiving/transmitting data, for example those depicted by FIG. 4. While the health device 110 is shown as a single device, in other embodiments, the health device 110 may be comprised of a cluster or plurality of computing devices, working together or working separately.

In exemplary embodiments, the smart device 120 includes a content filtering client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The content filtering client 122 may act as a client in a client-server relationship, and may be a software and/or hardware application capable of communicating with and providing a user interface for a user to interact with a server and other computing devices via the network 108. Moreover, in the example embodiment, the content filtering client 122 may be capable of transferring data from the smart device 120 to and from other devices via the network 108. In embodiments, the content filtering client 122 may utilize various wired and wireless connection protocols for data transmission and exchange, including Bluetooth, 2.4 gHz and 5 gHz internet, near-field communication, Z-Wave, Zigbee, etc. The content filtering client 122 is described in greater detail with respect to FIG. 2.

In the exemplary embodiments, the content filtering server 130 may include a content filter 132, and may act as a server in a client-server relationship with the content filtering client 122. The content filtering server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the content filtering server 130 is shown as a single device, in other embodiments, the content filtering server 130 may be comprised of a cluster or plurality of computing devices, working together or working independently. The content filtering server 130 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the content filter 132 may be a software and/or hardware program that may be capable of receiving a user configuration and defining a user cohort based on the received user configuration. In addition, the content filter 132 may be capable of extracting features from user content and determining whether the content presents any conflicts for the user. If it is determined that the content is conflicting for the user, the content filter 132 may be capable of notifying the user of the conflict. The content filter 132 may be further capable of assessing the user and generating or updating a flag associated with the content based on the assessment. The content filter 132 is described in greater detail with reference to FIG. 2, forthcoming.

Figure 2:
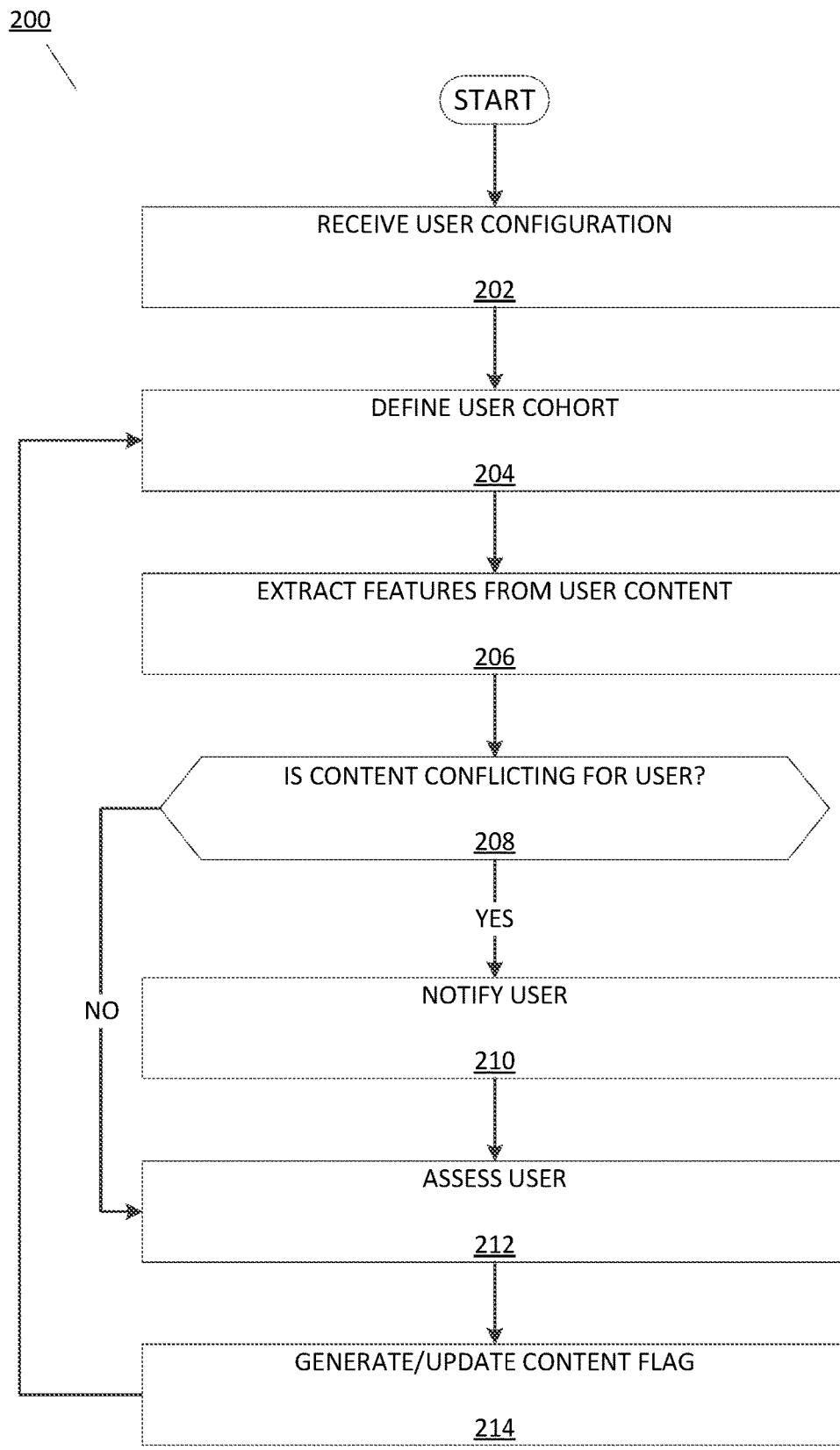
FIG. 2 depicts an exemplary flowchart 200 illustrating the operations of a content filter 132 of the content filtering system 100 in filtering content based on user state, in accordance with the exemplary embodiments.

FIG. 2 depicts an exemplary flowchart 200 illustrating the operations of the content filter 132 of the content filtering system 100 in filtering content based on user state, in accordance with the exemplary embodiments.

The content filter 132 may receive a user configuration (step 202). The content filter 132 may be configured for a user by receiving information such as a user registration and/or preferences, which may be uploaded by a user or administrator via the content filtering client 122 and the network 108. Receiving the user registration may involve receiving demographic information such as a name, age, gender, location, username, account credentials, email address, serial number, and the like, as well as data relating to user state, such as health conditions and conflicts such as sensitivities, intolerances, aggravators, etc. The content filter 132 may receive such the user registration data via user input, for example via a user interface of the content filtering client 122, or the content filter 132 may retrieve data from sources such as a user profile, electronic medical/health record (EMR/EHR), the health device 110, etc. In embodiments in which the content filter 132 is integrated with the health device 110, configuration of the content filter 132 may further include connecting and linking the health device 110 to the smart device 120, the network 108, and/or the content filtering server 130. In addition, the content filter 132 may further receive any user preferences pertaining to the content filtering system 100, such as data sharing preferences, preferred methods of notification, etc.

To further illustrate the operations of the content filter 132, reference is now made to an illustrative example in which the content filter 132 receives information from a user indicating an age, gender, and location of the user. In addition, the user links an up to date electronic health record indicating that the user has epilepsy, motion sickness, and a heart condition. Lastly, the user connects a wearable smart watch configured to extract additional health data, including user fitness activity and a pulse.

The content filter 132 may define one or more user cohorts (step 204). The content filter 132 may define one or more user cohorts in order to group individuals having similar features. Here, the content filter 132 may utilize the received user registration, such as demographic and user state data, in order to group one or more users into cohorts of similarly situated individuals. For example, the content filter 132 may define cohorts based on one or more users within a similar age group, a similar location, or having a similar health condition such as diabetes or high blood pressure. Such cohorts may be defined using binary labels (such as positive/negative), multiclass labels (stage I, stage II, stage III, etc.) ranges, etc., and may be defined using clustering methods such as K nearest neighbour (KNN), means-shift clustering, density-based spatial clustering of applications with noise (DBSCAN), expectation-maximization clustering using Gaussian Mixture Models, agglomerative hierarchical clustering, etc. Moreover, the content filter 132 may further anonymize the users and store the data using identifiers unique to an individual for future reference and/or updating.

With reference to the illustrative example introduced above in which the content filter 132 receives the user registration, the content filter 132 includes the user in a cohort of similarly aged individuals, a cohort for individuals of a same gender, and a cohort for users in/from a similar location. In addition, the content filter 132 includes the user in a cohort for individuals with epilepsy, a cohort for individuals with motion sickness, and a cohort for individuals with a heart condition.

The content filter 132 may extract features from content retrieved by the user (step 206). In embodiments, the retrieved content may include text, image, audio, video, augmented reality, diminished reality, virtual reality, etc., and may be viewed by the user via the smart device 120, such as a computer, mobile phone, etc. Moreover, the content filter 132 may extract features from the retrieved content by analysing metadata associated with content such that features related to the content may be extracted through various means. Such features may relate to a topic, quality, visual characteristics, audio characteristics, and other content characteristics, and may include content type, brightness, sharpness, contrast, resolution, volume/loudness, animation, speed, motion, sentiment, topic, geographic metadata, URL headers, abrupt changes in any of the above, etc. Overall, the content filter 132 may be configured to extract features for any content characteristics not limited to the aforementioned. In embodiments, the content filter 132 may extract text-based features using techniques such as content extraction, topic modelling, sentiment analysis, natural language processing, etc., and may extract audio/image/video metadata using techniques such as representational state transfer (REST) software, computer vision software, image quality detection software, etc. Having extracted features relating to the content, the content filter 132 may then group content having similar features based on feature range thresholds, when applicable. For example, the content filter 132 may group content having a similar volume or similar brightness. It should be noted that during the feature extraction process, the content filter 132 may be configured to pause, delay, stop, or otherwise block the content in order to prevent a user from experiencing the content until it can be determined whether the content poses a potential conflict to the user and/or a user waives the notification, as will be described in greater detail.

With reference again to the previously introduced example, the content filter 132 identifies the retrieved content as a virtual reality experience and extracts one or more features relating to brightness and volume.

The content filter 132 may determine whether the content is conflicting for the user (decision 208). In embodiments, the content filter 132 may determine whether the content is conflicting for the user by first determining whether the content has been previously noted as conflicting. For example, the content filter 132 may determine that the content has been flagged as conflicting to a particular user state by other individuals within a same cohorts as that of the user. In the example embodiment, the content filter 132 may determine if other individuals within the user cohorts have flagged the content by referencing a database in which one or more individuals indicate whether content may be conflicting, for example that which may be detrimental, sensitive, offensive, aggravating, etc., to those within the cohort. In such embodiments, the content filter 132 may simply reference the database to determine whether a flag is associated with the content.

In addition, the content filter 132 may determine whether content is conflicting by determining whether similar content, for example similar content grouped within a same feature range as that of the content, contains flags for the one or more cohorts in which the user is a member (decision 208 continued). In such embodiments, the content filter 132 may reference the database to determine whether a flag is associated with the content as well as all similar content within a same feature range. Based on determining that a similar content is flagged for the user cohort, the content filter 132 may infer that the content is similarly conflicting for the user.

In yet further embodiments, the content filter 132 may be configured to detect content conflicts based on analysis of the extracted features (decision 208 continued). In such embodiments, the content filter 132 may detect conflicting content based on one or more known relationships between content features and user states. For example, the database may detail user health conditions, such as epilepsy, and features of content associated with conflicts to those health conditions, such as flashing lights. In addition, the content filter 132 may detect conflicting content by identifying features of the content that vary by a substantial deviation from what may be considered a norm. For example, the content filter 132 may determine an average brightness of content and identify brightness within content that exceeds the average brightness by more than a standard deviation, etc. Based on such a determination, the content filter 132 may identify the content as potentially conflicting for users with brightness sensitivities.

In furthering the previously introduced example for illustration purposes, the content filter 132 determines that the content is flagged for flashing lights based on other individuals within the cohort flagging the content as such. Moreover, the content filter 132 determines that the content may be dizzying for those with motion sickness based on other similar virtual reality experiences having flags for causing dizziness. Lastly, the content filter 132 determines that the content includes loud noises based on an analysis of metadata associated with the virtual reality experience indicating that volumes levels a standard deviation greater than that of an average virtual reality experience.

Based on determining that the content is conflicting for the user (decision 208, "YES" branch), the content filter 132 notifies a user (step 210). In embodiments, the content filter 132 may notify the user of any conflicts, or flags, prior to the user experiencing the content by pausing, blocking, blurring, obscuring, muting, or otherwise preventing the user from experiencing the flagged content. The notification may be communicated via the smart device 120 and may comprise a pop-up, push notification, warning symbol, audio recording, vibration, or any other means to notify the user. The notification may further detail flag information associated with the content, such as the conflicting feature(s) within the content, a severity of the conflicting feature, cohorts typically affected by the conflicting feature, symptoms reported by those within the cohort after experiencing the content, etc. In addition to notifying the user of any flags associated with the content, the content filter 132 may additionally provide the user an option to dismiss the notification and/or continue to experience the content. It should be noted that while in the example embodiment, the user is provided a notification and an option to nonetheless view the content, in other embodiments, the content filter 132 may be configured to block content autonomously with no notification or option to view the content. Such a feature may be configured in, for example, the user preferences.

Continuing the illustrative example earlier introduced, the content filter 132 notifies the user via smart phone pop-up notification that the content includes flashing lights that may cause epileptic symptoms such as seizures, virtual reality that may cause motion sickness, and loud noises that may cause heart condition symptoms leading to a heart attack or stroke.

Based on determining that the content is not conflicting for the user (decision 208, "NO" branch) or after notifying the user of the conflict (step 210), the content filter 132 may assess the user (step 212). The content filter 132 may assess the user before, during, and/or after the user experiences the content in order to determine an effect that the content has on the user as it relates to state of the user. In embodiments, the content filter 132 may assess the user by prompting the user for information regarding a state before, during, and/or after viewing the content. Moreover, the prompt may further request information regarding one or more features and/or user states. For example, the content filter 132 may display a pop-up on the smart device 120 prompting the user to indicate a current anxiety level via a sliding scale before, during, and after experiencing the content. In addition, the content filter 132 may assess the user via communication with the health device 110. For example, the content filter 132 may retrieve pulse information from a smart watch while the user views a video. Overall, the content filter 132 may implement any means to assess a user before, during, and/or after experiencing the content and, once the content filter 132 determines that the viewer has stopped viewing the content, e.g., the content has ended, the content filter 132 may consolidate the user assessment from all sources. The content filter 132 may additionally identify trends of the user conflicts and responses to features over time, thereby personalizing the content filter 132. For example, the content filter 132 may modify a sensitivity of the user to some features over time if the user assessment indicates that a user is not particularly susceptible to that particular feature. Moreover, the content filter 132 may be further configured to provide the user an option to generate or modify any flags associated with the content, and include any additional notes regarding the content or flags. For example, the content filter 132 may provide a text box for the user to list any relevant notes, such as warnings, solutions, conditions under which those in the cohort may experience the content, etc.

With reference to the illustrative example introduced above, the content filter 132 prompts the user after experiencing the virtual reality to indicate whether the content was conflicting for the user as it relates to epilepsy, motion sickness, and a heart condition. In addition, the content filter 132 retrieves pulse and blood pressure information from the smart watch of the user prior to, during, and after the user views the content.

The content filter 132 may generate/update any content flag(s) (step 214). In embodiments, the content filter 132 may generate, if non-existent, or update one or more flags associated with the content based on the user assessment. The update may comprise the content filter 132 incorporating the information regarding the health state of the user into the information necessitating the tag. For example, the content filter 132 may update a content tag to reduce a severity of the feature based on assessed users having a lack of sensitivity to the feature. In addition, the content filter 132 may weight or average the data based on factors such as recency, reliability, etc. Moreover, the content filter 132 may further update the flag(s) with any notes included by the user during the user assessment. Note that in embodiments in which the user does not experience the content, generating/updating the content flag may be omitted.

In concluding the example introduced above, the content filter 132 may maintain the flag associating motion sickness with virtual reality based on the user indicating motion sickness during the experience, however reduce a severity of the flag associated with the flashing lights in response to the user indicating that they were not overly sensitive to the flashing lights. In addition, the content filter 132 may modify the flag associated with the loud noises based on the user smart watch recording a high pulse during the experience.

Figure 3:
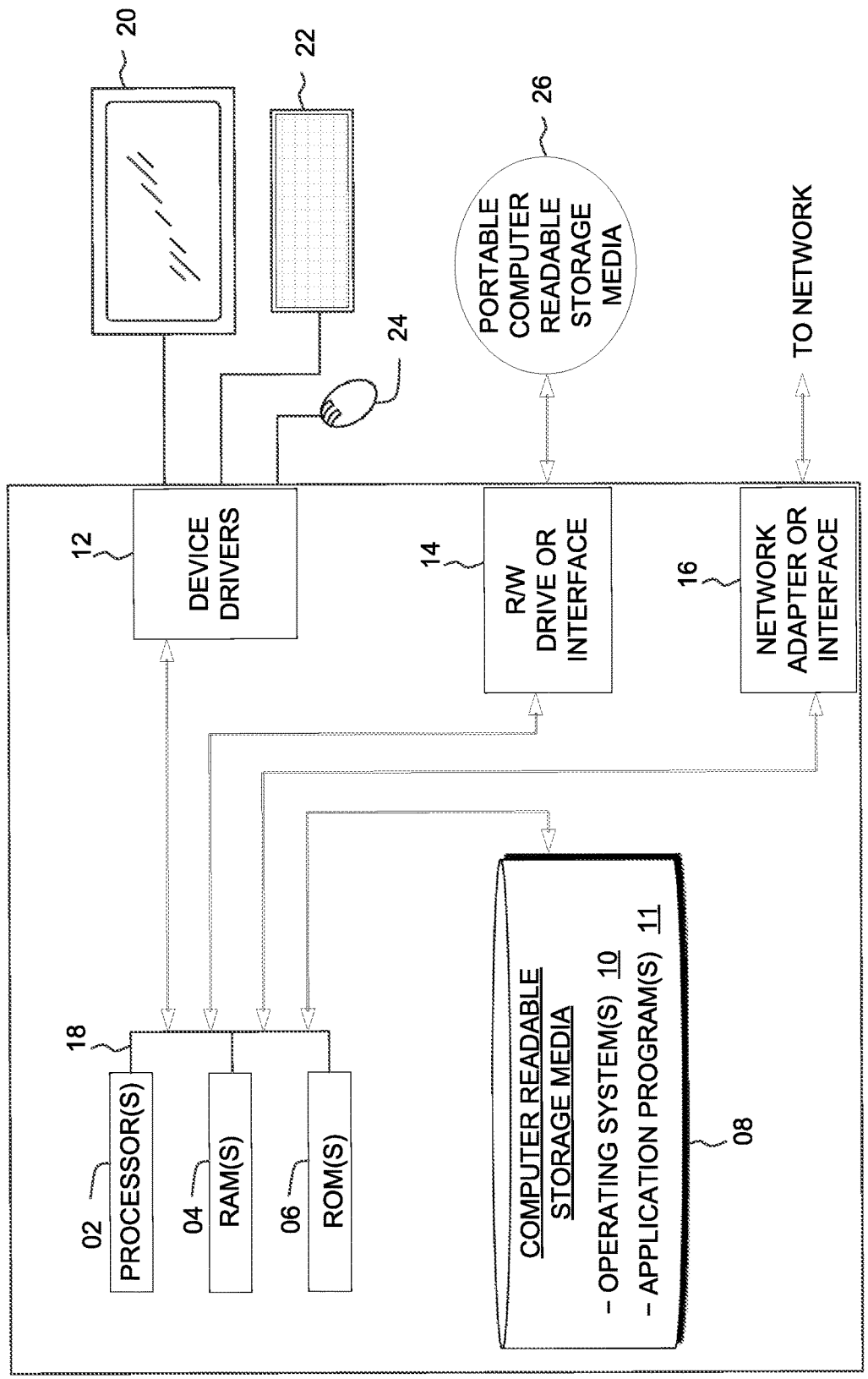
FIG. 3 depicts an exemplary block diagram depicting the hardware components of the content filtering system 100 of FIG. 1, in accordance with the exemplary embodiments.

FIG. 3 depicts a block diagram of devices within the content filtering system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
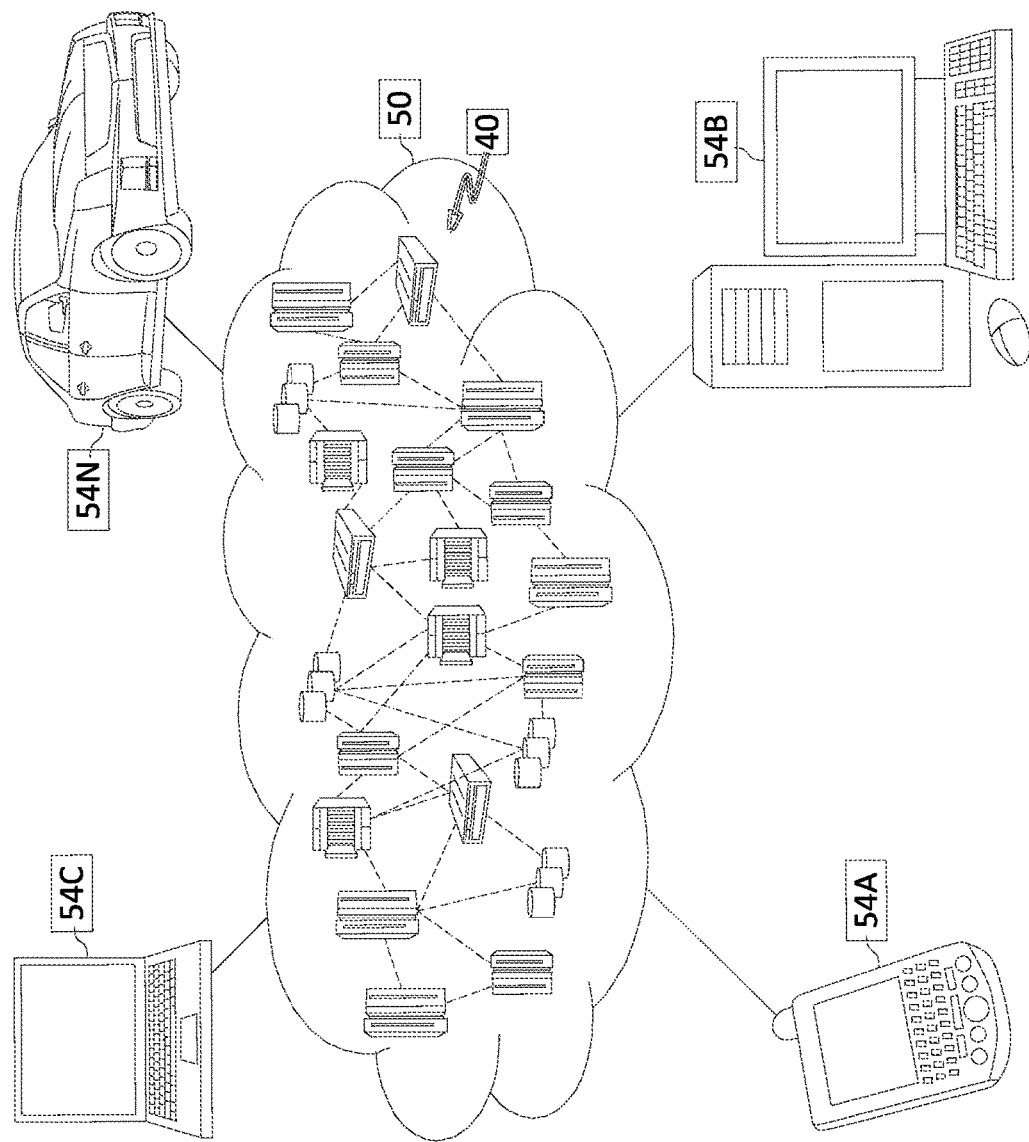
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 5:
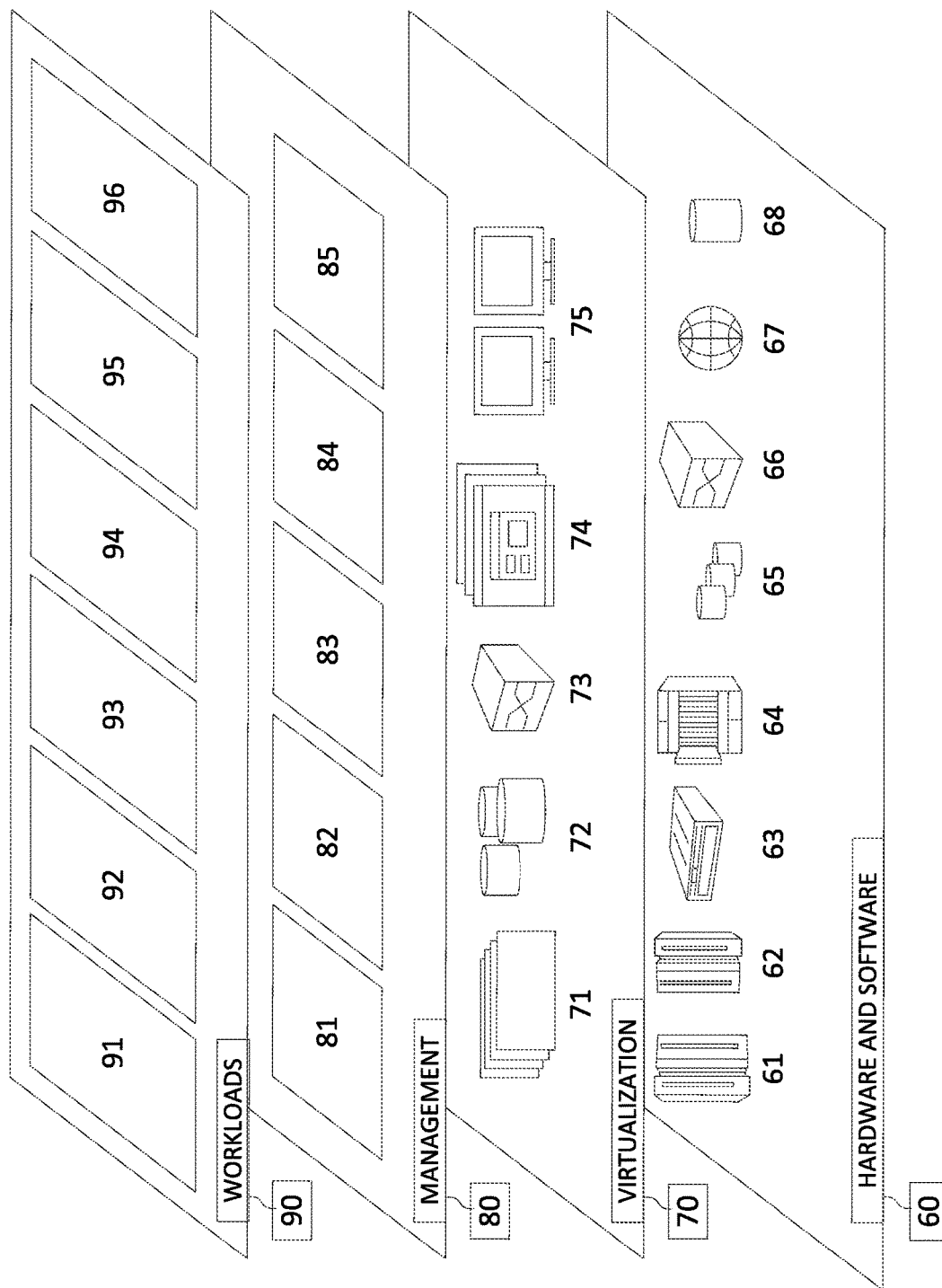
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assessment processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for filtering content based on user state, the method comprising:
    associating a user with one or more cohorts based on one or more health conditions and one or more health conflicts, wherein the one or more health conflicts aggravate the one or more health conditions, and wherein the one or more health conditions and the one or more health conflicts are further associated with one or more features;
    extracting at least one of the one or more features from a content retrieved by the user on a virtual reality device; and
    determining whether at least one of the one or more features conflict with at least one of the one or more cohorts based on the associating;
    based on determining that at least one of the one or more features conflict with at least one of the one or more cohorts, preventing the user from experiencing the content on the virtual reality device; and
    based on determining that none of the one or more features conflict with at least one of the one or more cohorts, playing the content on the virtual reality device.

2. The method of claim 1, further comprising:
    notifying the user of the determined conflict.

3. The method of claim 2, wherein playing the content on the virtual reality device is based on receiving a waiver of the notification from the user.

4. The method of claim 1, wherein determining whether at least one of the one or more features conflict with at least one of the one or more cohorts further comprises:
    determining whether an individual within the one or more cohorts has flagged the content.

5. The method of claim 1, wherein determining whether at least one of the one or more features conflict with at least one of the one or more cohorts further comprises:
    grouping the content with one or more similar content; and
    determining whether an individual within the or more cohorts has flagged the one or more similar content.

6. The method of claim 1, wherein determining whether at least one of the one or more features conflict with at least one of the one or more cohorts further comprises:
    determining whether at least one feature of the one or more features deviates from an average of the one or more features by a threshold.

7. The method of claim 1, further comprising:
    assessing the user at least one of before, during, or after experiencing the content; and
    updating a flag associated with the content based on the user assessment.

8. A computer program product for filtering content based on user state, the computer program product comprising:
    one or more non-transitory computer-readable storage media and program instructions stored on the one or more non-transitory computer-readable storage media capable of performing a method, the method comprising:

associating a user with one or more cohorts based on one or more health conditions and one or more health conflicts, wherein the one or more health conflicts aggravate the one or more health conditions, and wherein the one or more health conditions and the one or more health conflicts are further associated with one or more features;

extracting at least one of the one or more features from a content retrieved by the user on a virtual reality device; and determining whether at least one of the one or more features conflict with at least one of the one or more cohorts based on the associating;

based on determining that at least one of the one or more features conflict with at least one of the one or more cohorts, preventing the user from experiencing the content on the virtual reality device; and based on determining that none of the one or more features conflict with at least one of the one or more cohorts, playing the content on the virtual reality device.

9. The computer program product of claim 8, further comprising:
notifying the user of the determined conflict.

10. The computer program product of claim 9, wherein playing the content on the virtual reality device is based on receiving a waiver of the notification from the user.

11. The computer program product of claim 8, wherein determining whether at least one of the one or more features conflict with at least one of the one or more cohorts further comprises:
determining whether an individual within the one or more cohorts has flagged the content.

12. The computer program product of claim 8, wherein determining whether at least one of the one or more features conflict with at least one of the one or more cohorts further comprises:
grouping the content with one or more similar content; and
determining whether an individual within the or more cohorts has flagged the one or more similar content.

13. The computer program product of claim 8, wherein determining whether at least one of the one or more features conflict with at least one of the one or more cohorts further comprises:
determining whether at least one feature of the one or more features deviates from an average of the one or more features by a threshold.

14. The computer program product of claim 8, further comprising:
assessing the user at least one of before, during, or after experiencing the content; and
updating a flag associated with the content based on the user assessment.

15. A computer system for filtering content based on user state, the computer system comprising:
one or more computer processors, one or more computer-readable storage media, and program instructions stored on one or more of the computer-readable storage media for execution by at least one of the one or more processors capable of performing a method, the method comprising:

associating a user with one or more cohorts based on one or more health conditions and one or more health conflicts, wherein the one or more health conflicts aggravate the one or more health conditions, and wherein the one or more health conditions and the one or more health conflicts are further associated with one or more features;

extracting at least one of the one or more features from a content retrieved by the user on a virtual reality device; and determining whether at least one of the one or more features conflict with at least one of the one or more cohorts based on the associating;

based on determining that at least one of the one or more features conflict with at least one of the one or more cohorts, preventing the user from experiencing the content on the virtual reality device; and based on determining that none of the one or more features conflict with at least one of the one or more cohorts, playing the content on the virtual reality device.

16. The computer system of claim 15, further comprising:
notifying the user of the determined conflict.

17. The computer system of claim 16, wherein playing the content on the virtual reality device is based on receiving a waiver of the notification from the user.

18. The computer system of claim 15, wherein determining whether at least one of the one or more features conflict with at least one of the one or more cohorts further comprises:
determining whether an individual within the one or more cohorts has flagged the content.

19. The computer system of claim 15, wherein determining whether at least one of the one or more features conflict with at least one of the one or more cohorts further comprises:
grouping the content with one or more similar content; and
determining whether an individual within the or more cohorts has flagged the one or more similar content.

20. The computer system of claim 15, wherein determining whether at least one of the one or more features conflict with at least one of the one or more cohorts further comprises:
determining whether at least one feature of the one or more features deviates from an average of the one or more features by a threshold.

* * * * *